United States Patent
Rossberg et al.

(10) Patent No.: US 9,136,662 B2
(45) Date of Patent: Sep. 15, 2015

(54) METHOD FOR MANUFACTURING A CONNECTION BETWEEN TWO CERAMIC PARTS, ESPECIALLY PARTS OF A PRESSURE SENSOR, AND A CERAMIC PRODUCT, ESPECIALLY A CERAMIC PRESSURE SENSOR

(75) Inventors: Andreas Rossberg, Bad Sackingen (DE); Michael Philipps, Lorrach (DE); Frank Hegner, Lorrach (DE); Ulfert Drewes, Mullheim (DE); Jorg Muller, Buccholz (DE); Marco Doms, Oppenheim (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 211 days.

(21) Appl. No.: 13/881,533

(22) PCT Filed: Oct. 28, 2011

(86) PCT No.: PCT/EP2011/068943
§ 371 (c)(1),
(2), (4) Date: Apr. 25, 2013

(87) PCT Pub. No.: WO2012/055989
PCT Pub. Date: May 3, 2012

(65) Prior Publication Data
US 2013/0213138 A1    Aug. 22, 2013

(30) Foreign Application Priority Data
Oct. 29, 2010 (DE) .......................... 10 2010 043 119

(51) Int. Cl.
*C04B 37/00* (2006.01)
*G01L 7/08* (2006.01)
(Continued)

(52) U.S. Cl.
CPC ............ *H01R 43/0235* (2013.01); *B23K 1/008* (2013.01); *B23K 1/0008* (2013.01);
(Continued)

(58) Field of Classification Search
CPC ................... C04B 2237/72; C04B 2235/6581; C04B 2237/60; C04B 2237/122; C04B 2237/127–2237/128; C04B 2237/343; C04B 2237/592; C04B 2237/708; G01L 9/0075; G01L 9/0042; B23K 1/0008; B23K 1/008; B23K 1/19; B23K 35/32; B23K 35/0222
USPC ............. 73/700, 718; 228/121, 124.5, 262.75
See application file for complete search history.

(56) References Cited

U.S. PATENT DOCUMENTS

| | | | | |
|---|---|---|---|---|
| 4,917,642 A | * | 4/1990 | Nakahashi et al. | ............. 445/44 |
| 5,334,344 A | | 8/1994 | Hegner et al. | |

(Continued)

FOREIGN PATENT DOCUMENTS

| | | |
|---|---|---|
| DE | 36 02 104 A1 | 7/1987 |
| DE | 36 02 132 A1 | 7/1987 |

(Continued)

OTHER PUBLICATIONS

German Search Report dated Jan. 12, 2011, issued in Application No. 10 2010 043 119.2, issued in Munich, Germany.

(Continued)

*Primary Examiner* — Lisa Caputo
*Assistant Examiner* — Jonathan Dunlap
(74) *Attorney, Agent, or Firm* — Bacon & Thomas, PLLC

(57) ABSTRACT

A method for manufacturing a connection between two ceramic parts comprises: providing a first ceramic part and a second ceramic part; providing an active hard solder, or active braze, on at least one surface section of at least one of the ceramic parts; and heating the active hard solder, or active braze, in a vacuum soldering, brazing process. The entire active hard solder, or active braze, for connecting the first and second ceramic parts is provided in such a manner that at least one surface section of at least one of the ceramic parts, preferably both ceramic parts, is coated by means of gas phase deposition of the alloy of the active hard solder, or active braze.

12 Claims, 1 Drawing Sheet

(51) Int. Cl.
  *B23K 1/00* (2006.01)
  *H01R 43/02* (2006.01)
  *B23K 35/02* (2006.01)
  *B23K 35/32* (2006.01)
  *B23K 1/008* (2006.01)
  *B23K 1/19* (2006.01)
  *G01L 7/00* (2006.01)

(52) U.S. Cl.
  CPC .............. *B23K 1/19* (2013.01); *B23K 35/0222* (2013.01); *B23K 35/32* (2013.01); *C04B 37/006* (2013.01); *G01L 7/00* (2013.01); *C04B 2235/6581* (2013.01); *C04B 2235/72* (2013.01); *C04B 2237/122* (2013.01); *C04B 2237/127* (2013.01); *C04B 2237/128* (2013.01); *C04B 2237/343* (2013.01); *C04B 2237/592* (2013.01); *C04B 2237/60* (2013.01); *C04B 2237/708* (2013.01)

(56) References Cited

U.S. PATENT DOCUMENTS

| | | | |
|---|---|---|---|
| 5,351,938 A | 10/1994 | Hegner et al. | |
| 6,039,918 A * | 3/2000 | Hegner et al. | 420/422 |
| 6,050,478 A | 4/2000 | Saint-Antonin et al. | |
| 6,156,130 A * | 12/2000 | Hegner et al. | 148/24 |
| 6,528,123 B1 * | 3/2003 | Cadden et al. | 427/404 |
| 6,616,032 B1 * | 9/2003 | Gasse et al. | 228/248.1 |
| 7,141,447 B2 * | 11/2006 | Grudzien | 438/51 |
| 7,284,439 B2 * | 10/2007 | Jonsson | 73/724 |
| 7,624,643 B2 * | 12/2009 | Grudzien | 73/718 |
| 7,814,798 B2 * | 10/2010 | Filippi et al. | 73/715 |
| 8,104,353 B2 | 1/2012 | Drewes et al. | |
| 2008/0110269 A1 * | 5/2008 | Strietzel et al. | 73/718 |
| 2012/0055256 A1 * | 3/2012 | Drewes | 73/753 |
| 2012/0258322 A1 | 10/2012 | Berlinger et al. | |
| 2013/0213138 A1 * | 8/2013 | Rossberg et al. | 73/700 |
| 2013/0263670 A1 * | 10/2013 | Selders et al. | 73/700 |

FOREIGN PATENT DOCUMENTS

| | | |
|---|---|---|
| DE | 10 2007 026 243 A1 | 12/2008 |
| FR | 2 751 640 A1 | 1/1998 |
| WO | 2011/072959 A1 | 6/2011 |

OTHER PUBLICATIONS

International Preliminary Report on Patentability dated Jan. 31, 2012, issued in Application No. PCT/EP2011/068943, issued in Rijswijk, Netherlands.

International Preliminary Report on Patentability dated May 10, 2013, issued in Application No. PCT/EP2011/068943, issued in Geneva, Switzerland.

* cited by examiner

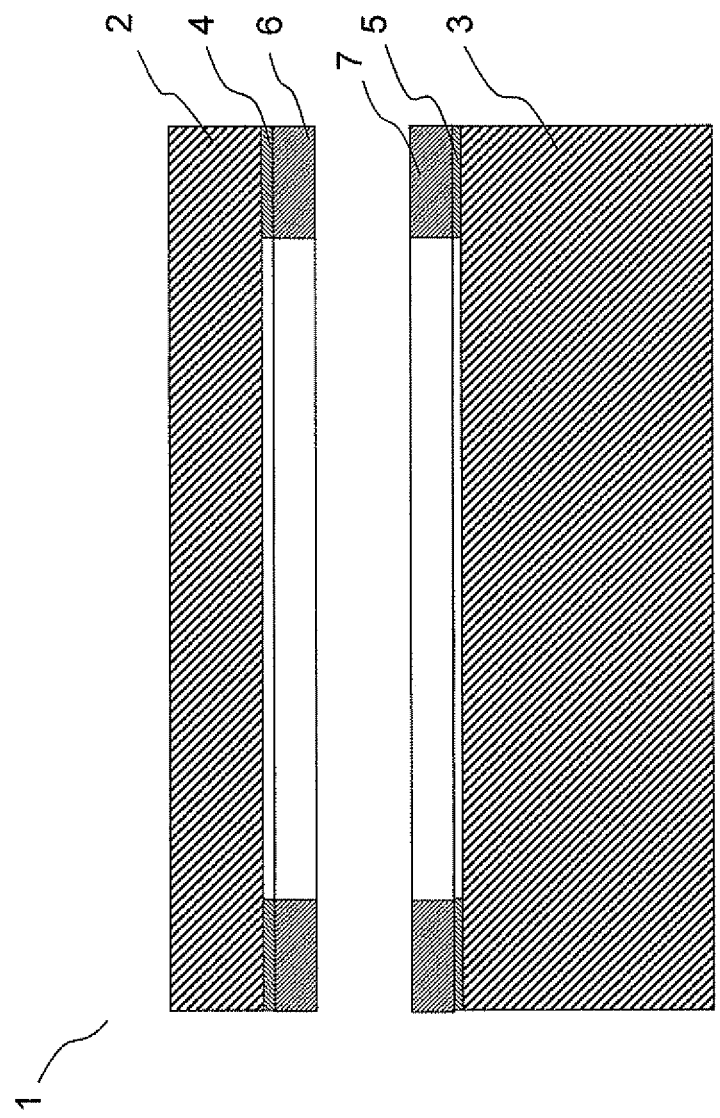

METHOD FOR MANUFACTURING A CONNECTION BETWEEN TWO CERAMIC PARTS, ESPECIALLY PARTS OF A PRESSURE SENSOR, AND A CERAMIC PRODUCT, ESPECIALLY A CERAMIC PRESSURE SENSOR

TECHNICAL FIELD

The present invention relates to a method for manufacturing a connection between two ceramic parts, especially parts of a pressure sensor, and to a ceramic product, especially a ceramic pressure sensor.

BACKGROUND DISCUSSION

Ceramic pressure sensors comprise a platform and a measuring membrane, wherein the measuring membrane is joined with the platform by means of an active hard solder, or active braze. A suitable active hard solder, or active braze, for joining ceramic parts of corundum is, for example, a Zr—Ni—Ti alloy, since such alloys have coefficients of thermal expansion compatible with corundum.

European Patent EP 0 490 807 B1 discloses such an active hard solder, or active braze. European Patent EP 0 558 874 B1 discloses a method for manufacturing rings of such an active hard solder, or braze. Rings of active hard solder, or active braze, for connecting the measuring membrane and platform are placed as space holders between the two parts, and melted in a high vacuum, soldering process, whereby a pressure tight and high strength annular connection arises between the two ceramic parts. An alternative for applying the solder in the form of prefabricated rings is to provide the active hard solder, or active braze, in a screen printing process. A screen printable paste of the active hard solder, or active braze, and a method for its manufacture is disclosed in Offenlegungsschrift (laid open application) EP 0 988 919 A1.

The rings can, however, only be manufactured with reproducible quality with a minimum thickness of, for instance, 30 µm and also the screen printable paste includes granulations, which lead to joints with a minimum thickness of, for instance, 30 µm between the ceramic parts.

The desire for miniaturization of pressure sensors means indirectly a need for a thinner joint. For example, in the case of a ceramic pressure sensor with a capacitive transducer, miniaturization leads to a reduction of the electrode areas of the capacitive transducer, which then must be compensated by a lessening of the distance.

SUMMARY OF INVENTION

It is, therefore, an object of the present invention to provide a method, which overcomes the disadvantages of the state of the art.

The object is achieved according to the invention by the method for manufacturing a connection between two surfaces or surface sections of two ceramic parts, which comprises the steps of: providing a first ceramic part and a second ceramic part; providing an active hard solder, or active braze, on at least one surface section of at least one of the ceramic parts; and heating the active hard solder, or active braze, in a soldering, brazing process, wherein according to the invention the entire active hard solder, or active braze, for connecting the first and second ceramic parts is provided in such a manner that at least one surface section of at least one of the ceramic parts, preferably both ceramic parts, is coated by means of a gas phase deposition of the alloy of the active hard solder, or active braze, and/or its components.

According to a currently preferred further development of the invention, the gas phase deposition comprises a sputtering process, in order to transfer the components of the active hard solder, or active braze, into the gas phase.

Furthermore, instead of sputtering, according to the invention, a thermal evaporating of the active braze material can occur. In this case, it is advantageous to provide the components of the alloy from different sources, for example, crucibles, wherein the evaporation rates for maintaining a desired composition of the alloy are controlled, for example, via the temperatures of the sources.

In a further development of the invention, the active hard solder, or active braze, comprises a plurality of components, wherein, in the sputter process, a sputter target, or cathode, is used, which preferably contains all components of the active hard solder, or active braze.

The active hard solder, or active braze, according to a further development of the invention, comprises a desired composition, in which components $K_i$ of the active hard solder, or active braze, are present in a weight percent $c_i$, and in the case of which the difference between the coefficient of thermal expansion of the active hard solder, or active braze, and the coefficient of thermal expansion of the material the ceramic parts, especially in the case of given strength of the joint, has a minimum, wherein the sputter target contains the components of the active hard solder, or active braze, in proportions $c_i$, target, which have relative deviations $d_i$ of the individual components from the desired composition, $c_i$, desired, as follows:

$$d_i := |(c_i, \text{target} - c_i, \text{desired})/c_i, \text{desired}|$$

wherein $d_i < 4\%$, preferably no more than 2% and especially preferably no more than 1%.

In a further development of the invention, the at least one surface section of the at least one ceramic part is coated by means of gas phase deposition, first of all, only with one active component of the active hard solder, or active braze. In such case, the one active component is, on the one hand, applied, in a thickness, which amounts, for example, to no more than 5%, preferably no more than 2% and especially preferably no more than 1% of the total thickness of the active hard solder, or active braze, between the first and second ceramic parts. On the other hand, the one active component is applied in a thickness, which amounts, for example, to not less than 0.1%, preferably not less than 0.2% of the total thickness of the active hard solder, or active braze, between the first and second ceramic parts.

In an embodiment of the invention, the coating with the one active component has, on the one hand, a thickness of, for example, not less than 10 nm, especially not less than 40 nm, and preferably not less than 80 nm, wherein, on the other hand, the coating with the one active component has a thickness of, for example, no more than 400 nm, especially no more than 300 nm, and preferably no more than 200 nm.

In a further development of the invention, the one active component for gas phase deposition is brought into the gas phase by means of a sputtering process, wherein in the sputter process a sputter target is used, which contains only the one active component.

In a further development of the invention, the active hard solder, or active braze, comprises a Zr—Ni—Ti alloy, wherein the at least one active component comprises especially titanium or zirconium.

The components of the active hard solder, or active braze, can, according to a further development of the invention, for example, have a desired composition as follows: $55<c_{Zr}<65.5$, $20.5<c_{Ni}<27.5$ and $14<c_{Ti}<17.5$, especially $61<c_{Zr}<63.5$, $21.5<c_{Ni}<24$ and $14.5<c_{Ti}<15.5$.

In a further development of the invention, the first ceramic part and the second ceramic part are pressure-tightly connected along an annular joint, which surrounds a hollow space between the first ceramic part and the second ceramic part, wherein the active hard solder, or active braze, is deposited on at least one annular surface section of a ceramic part, wherein a region surrounded by the annular surface section is masked during the deposition of the active hard solder, or active braze.

In a further development of the invention, the soldering process is a vacuum soldering, brazing process or a soldering, brazing process under protective gas.

The ceramic product of the invention, which is especially obtainable according to the method of the invention, comprises a first ceramic part and a second ceramic part, wherein the first and second ceramic parts are joined by means of a joint, which comprises an active hard solder, or active braze, wherein the active hard solder, or active braze, in the joint has a thickness of no more than 20 μm, especially no more than 17 μm, preferably no more than 14 μm and especially preferably no more than 12 μm.

In a further development of the invention, the ceramic parts comprise corundum, wherein the active hard solder, or active braze, comprises a Zr—Ni—Ti alloy.

In a further development of the invention, the ceramic product is a pressure sensor, wherein the first ceramic part comprises a platform of the pressure sensor, wherein the second ceramic part comprises the measuring membrane of the pressure sensor, and wherein the measuring membrane is connected pressure-tightly with the platform along an annular joint, which comprises the active hard solder, or active braze.

BRIEF DESCRIPTION OF THE DRAWINGS

The invention will now be explained based on the example of an embodiment illustrated in the drawing, the sole figure of which shows as follows:

FIG. 1 the components a ceramic pressure sensor, which are joined by means of the method of the invention.

DETAILED DISCUSSION IN CONJUNCTION WITH THE DRAWING

The components of a ceramic pressure sensor 1 illustrated in FIG. 1 comprise a circular disk shaped measuring membrane 2 and a circular disk shaped platform 3, both of corundum. Especially, the measuring membrane can be highly pure corundum with a purity of more than 99.98%. The measuring membrane 1 and the platform 2 have, depending on embodiment, for example, a diameter of, for instance, 15 to 25 mm. The diameter is, however, not a variable essential to the invention and can be selected, for example, according to metrological requirements or other boundary conditions. Measuring membrane 1 and platform 2 are to be connected pressure-tightly by means of a Zr—Ni—Ti-active hard solder, or active braze, in a high vacuum soldering process.

For this, the end faces of the measuring membrane 1 and platform 2 to be joined are, first of all, in each case, masked, except for an annular edge region, in order then to prepare, by means of gas phase deposition, the active hard solder, or active braze, for the joint in the annular edge region.

In order to facilitate reaction with the respective ceramic substrates, instead of direct deposition of the alloy with a desired composition, first of all, exclusively an active component can be deposited. This can be, for example, a titanium layer in a thickness of, for example, in each case, for instance, 100 nm. The coatings 4, 5 can be prepared, for example, in a sputtering process with a pure Ti target.

Then, in each case, on the annular regions of the measuring membrane and platform precoated with the active component, a part of the active hard solder, or active braze, required for the thickness of the joint can be deposited. The division can be, for example, half and half, according to which in the case of a desired thickness of the joint of, for example, for instance, 10 μm, in each case, an annular layer 6, 7 with a thickness of, for instance, 5 μm can be deposited in the desired composition on the measuring membrane and on the platform. For this, a target is applied, which contains the alloy of the active hard solder, or active braze, in the desired composition. The target can be produced, for example, using powder metallurgical methods.

In order to achieve efficient deposition rate with sufficiently good control of the rate, preferably a sputtering facility with a high power magnetron is applied. In this way, deposition rates can be controlled between, for example, about 0.2 nm/s to about 2 nm/s. For depositing the 5 μm, in the case of a deposition rate of 2 mm/s, then 2500 s, or about 42 minutes, are required.

After complete deposition of the active hard solder, or active braze, the joint is formed by placing the measuring membrane 2 and the platform 3 with the active hard solder rings on top of one another and vacuum soldering, brazing, at about 900° C., in order to connect the two part pressure-tightly with one another.

Preferably, before deposition of the active hard solder, or active braze, electrodes (not shown) are prepared for a capacitive transducer of the pressure sensor. This can likewise occur by means of gas phase deposition in a sputter process. Suitable as electrode material is, for example, Ta, which is deposited in a thickness of, for example, 0.1 to 0.2 μm. A preferred electrode arrangement can enable, for example, the forming of a differential capacitor, for which, on the end of the platform in the region surrounded by the annular joint, a central, circular disk shaped measuring electrode is deposited, along with an annular reference electrode surrounding the measuring electrode and having equal capacitance.

The measuring electrode, the reference electrode and the joint are preferably electrically isolated from one another in the finished pressure sensor.

Prepared on the membrane is preferably a full surface, counter electrode, which, in the finished sensor, is preferably in galvanic contact with the joint.

The invention claimed is:
1. A method for manufacturing a connection between two ceramic parts, comprising the steps of:
providing a first ceramic part and a second ceramic part;
providing an active hard solder, or active braze, on at least one surface section of at least one of the ceramic parts; and
heating the active hard solder, or active braze, in a soldering, brazing process, wherein:
the entire active hard solder, or active braze, for connecting the first and second ceramic parts is provided in such a manner that at least one surface section of at least one of the ceramic parts, preferably both ceramic parts, is coated by means of gas phase deposition of the alloy of the active hard solder, or active braze, and/or its components, the gas phase deposition comprises a sputtering process or thermal evaporating, in order to transfer the components of the active hard solder, or active braze, into the gas phase, the active hard solder, or active braze, has a plurality of components, and wherein, in the sputter process, a sputter target is used, which contains the components of the active hard solder, or active braze, the active hard solder, or active braze, has a desired composition, in which components Ki of the active hard solder, or active braze, are present in a weight percent ci, and in the case of which the difference between the coefficient of thermal expansion of the active hard solder, or active braze, and the coefficient of thermal expansion of the material of the ceramic parts has a minimum, wherein the sputter target contains the components of the active hard solder, or active braze, in proportions ci, target, which have relative deviations di of the individual components from the desired composition ci, desired, as follows:

$$di := |(c_{i,\,target} - c_{i,\,desired})/c_{i,\,desired}|$$

wherein di<4%, preferably no more than 2% and especially preferably no more than 1%.

2. The method as claimed in claim 1, wherein:
the at least one surface section of the at least one ceramic part is coated by means of gas phase deposition, first of all, only with at least one active component of the active hard solder, or active braze.

3. Method as claimed in claim 2, wherein:
the coating with the at least one active component has a thickness of not less than 10 nm, especially not less than 40 nm, and preferably not less than 80 nm.

4. The method as claimed in claim 2, wherein:
the coating with the at least one active component has a thickness of no more than 400 nm, especially no more than 300 nm, and preferably no more than 200 nm.

5. The method as claimed in claim 2, wherein:
the at least one active component for gas phase deposition is brought into the gas phase by means of a sputter process; and
in the sputter process a sputter target is used, which contains only the at least one active component.

6. The method as claimed in claim 1, wherein:
the soldering, brazing process is a vacuum soldering, brazing process or a soldering, brazing process under protective gas.

7. The method as claimed in claim 1, wherein:
the active hard solder, or active braze, comprises a Zr—Ni—Ti alloy, and wherein the at least one active component comprises Ti or Zr.

8. The method as claimed in claim 1, wherein:
the concentrations of the components of the active hard solder, or active braze, in the desired composition are as follows: $55 < c_{Zr} < 65.5$, $20.5 < c_{Ni} < 27.5$ and $14 < c_{Ti} < 17.5$, especially $61 < c_{Zr} < 63.5$, $21.5 < c_{Ni} < 24$ and $14.5 < c_{Ti} < 15.5$.

9. The method as claimed in claim 1, wherein:
the first ceramic part and the second ceramic part are pressure-tightly connected along an annular joint, which surrounds a hollow space between the first ceramic part and the second ceramic part;
the active hard solder, or active braze, is deposited on at least one annular surface section of a ceramic part; and
a region surrounded by the annular surface section is masked during deposition of the active hard solder, or active braze.

10. A ceramic product, obtainable according to the method defined in claim 1, the ceramic product, comprises:
a first ceramic part; and
a second ceramic part, said first and said second ceramic parts are joined by means of a joint, which comprises an active hard solder, or active braze, wherein:
said active hard solder, or active braze, in said joint has a thickness of no more than 20 μm, especially no more than 17 μm, preferably no more than 14 μm and especially preferably no more than 12 μm.

11. The ceramic product as claimed in claim 10, wherein:
the ceramic parts comprise corundum; and
said active hard solder, or active braze, comprises a Zr—Ni—Ti alloy.

12. The ceramic product as claimed in claim 10, wherein:
the product is a pressure sensor;
said first ceramic part comprises a platform of the pressure sensor, said second ceramic part comprises said measuring membrane of the pressure sensor; and
said measuring membrane is connected pressure-tightly with the platform along an annular joint, which comprises the active hard solder, or active braze.

* * * * *